US 8,280,828 B2

(12) United States Patent
Perronnin et al.

(10) Patent No.: US 8,280,828 B2
(45) Date of Patent: Oct. 2, 2012

(54) FAST AND EFFICIENT NONLINEAR CLASSIFIER GENERATED FROM A TRAINED LINEAR CLASSIFIER

(75) Inventors: Florent Perronnin, Domene (FR); Jorge Sanchez, Cordoba (AR)

(73) Assignee: Xerox Corporation, Norwalk, CT (US)

(*) Notice: Subject to any disclaimer, the term of this patent is extended or adjusted under 35 U.S.C. 154(b) by 683 days.

(21) Appl. No.: 12/483,391

(22) Filed: Jun. 12, 2009

(65) Prior Publication Data
US 2010/0318477 A1 Dec. 16, 2010

(51) Int. Cl.
G06F 19/24 (2011.01)
G06F 17/16 (2006.01)

(52) U.S. Cl. .......................... 706/12; 706/20

(58) Field of Classification Search ............ 706/12
See application file for complete search history.

(56) References Cited

OTHER PUBLICATIONS

Colombo et al., Behavior monitoring through automatic analysis of video sequences. CIVR'07 [online], Jul. 9-11, 2007 [retrieved on Feb. 23, 2012]. Retrieved from the Internet< URL: http://bluecoat-01/?cfru=aHR0cDovL3d3dy5kc2kudW5pZmkuaXQvdXNlcnMvY29sb21iby9DQy9QdWJsaWNhMvY2I2cjA3LnBkZg==>.*
Boughorbel et al., "Non-Mercer Kernels for SVM Object Recognition," BMVC (2004).
Bahlmann et al., "On-line Handwriting Recognition with Support Vector Machines—A Kernel Approach," IWFHR (2002).
Krishnapuram et al., "Sparse Multinomial Logistic Regression: Fast Algorithms and Generalization Bounds," IEEE PAMI (2005).
Perronnin et al., "Fisher Kernels on Visual Vocabularies for Image Categorization," IEEEE CVPR (2007).
Pekalska et al., "A Generalized Kernel Approach to Dissimilarity-based Classification," JMLR, Special Issue on Kernel Methods, vol. 2, No. 2, pp. 175-211 (2002).
Zhang et al., "Local Features and Kernels for Classification of texture and Object Categories: an In-Depth Study;," Technical Report RR-5737, INRIA (2005).
Maji et al., "Classification Using Intersection Kernel Support Vector Machines is Efficient," IEEE CVPR (2008).
Muller et al., "An Introduction to Kernel-Based Learning Algorithms," IEEE Transactions on Neural Networks, vol. 12, No. 2, Mar. 2001.
Scholkopf et al., "Nonlinear Component Analysis as a Kernel Eigenvalue Problem," Technical Report No. 44, Max Planck Institut fur Biologische Kybernetik, Dec. 1996.
Perronnin et al., "Fisher Kernels on Visual Vocabularies for Image Categorization," IEEE conference on computer vision and pattern recognition, Jun. 2007.
Zhang et al., "Local Features and Kernels for Classification of Texture and Object Categories: A Comprehensive Study," International Journal of Computer Vision, vol. 73, No. 2, Sep. 2006.
Hotta, "Non-Linear Feature Extraction by Linear PCA Using Local Kernel," 19th International Conference on Pattern Recognition, Dec. 2008.
Roweis et al., "Nonlinear Dimensionality Reduction by Locally Linear Embedding," Science, vol. 290, No. 5500, Dec. 2000.

* cited by examiner

Primary Examiner — Jeffrey A Gaffin
Assistant Examiner — Nathan Brown, Jr.
(74) Attorney, Agent, or Firm — Fay Sharpe LLP

(57) ABSTRACT

A classifier method comprises: projecting a set of training vectors in a vector space to a comparison space defined by a set of reference vectors using a comparison function to generate a corresponding set of projected training vectors in the comparison space; training a linear classifier on the set of projected training vectors to generate a trained linear classifier operative in the comparison space; and transforming the trained linear classifier operative in the comparison space into a trained nonlinear classifier that is operative in the vector space to classify an input vector.

19 Claims, 3 Drawing Sheets

FAST AND EFFICIENT NONLINEAR CLASSIFIER GENERATED FROM A TRAINED LINEAR CLASSIFIER

BACKGROUND

The following relates to the information processing arts, information storage arts, classification arts, and related arts.

Objects such as images, speech segments, text documents, or the like are commonly represented as digital files or digital representations, for example as bitmaps or grayscale or color pixel maps in the case of images, audio files in the case of speech segments, text or word processing files in the case of text documents, or so forth. In the processing and/or storage of such objects, it is useful to classify the objects respective to one or more classes. For example, images can be classified by subject matter, e.g. images of cats, images of dogs, images of vehicles, images of people, or so forth.

To facilitate classification, a vector representation of an object may be generated. For images, a suitable vector can be generated by computing features at selected image patches or sampling regions distributed across the image, and employing the computed features as elements of the feature vector. For images, a Fisher vector or "bag-of-visual-words" vector representation can be used as a suitable vector representation. In the case of text documents, a "bag-of-words" vector representation is sometimes used, in which each vector element corresponds to a word and has a value indicative of a count of occurrences of that word in the text document.

The classifier receives the vector representation of the object and outputs a classification based on the vector representation. The classification may be hard (e.g., "1" if the object is assigned to the class or "0" otherwise), or can be soft (e.g., the classification output is a value between 0 and 1 inclusive with higher values indicating a higher likelihood of membership in the class). A soft classification can be converted to a hard classification by thresholding. Typically, the classifier has adjustable parameters whose values are determined by training respective to a labeled training set. The objective of the training is to select the adjustable parameters such that the output of the classifier substantially agrees with the classification labels assigned to the objects of the training set.

In general, classifiers may be linear or nonlinear. Linear classifiers are typically computationally efficient as compared with nonlinear classifiers. On the other hand, nonlinear classifiers are typically more accurate than linear classifiers. It would be advantageous to construct a nonlinear classifier that retains the accuracy typical of nonlinear classifiers, but which has efficiency typical of linear classifiers at runtime.

BRIEF DESCRIPTION

In some illustrative embodiments disclosed as illustrative examples herein, a method comprises: projecting a set of training vectors in a vector space to a comparison space defined by a set of reference vectors using a comparison function to generate a corresponding set of projected training vectors in the comparison space; training a linear classifier on the set of projected training vectors to generate a trained linear classifier operative in the comparison space; and transforming the trained linear classifier operative in the comparison space into a trained nonlinear classifier operative in the vector space.

In some illustrative embodiments disclosed as illustrative examples herein, a trained nonlinear classifier is disclosed that is operative in a vector space and generated by the method of the immediately preceding paragraph.

In some illustrative embodiments disclosed as illustrative examples herein, a computer-readable storage medium is disclosed which is encoded with instructions executable by a digital processor to perform a method comprising (i) projecting a set of training vectors in a vector space to a comparison space defined by a set of reference vectors using a comparison function comprising a vector element comparison for each dimension of the vector space summed over the dimensions of the vector space to generate a corresponding set of projected training vectors in the comparison space, (ii) training a linear classifier on the set of projected training vectors to generate a trained linear classifier operative in the comparison space, and (iii) transforming the trained linear classifier operative in the comparison space into a trained nonlinear classifier operative in the vector space.

In some illustrative embodiments disclosed as illustrative examples herein, a system is disclosed. A classifier training sub-system is configured to perform a method including: projecting a set of training vectors in a vector space to a comparison space defined by a set of reference vectors using a comparison function comprising a vector element comparison for each dimension of the vector space summed over the dimensions of the vector space to generate a corresponding set of projected training vectors in the comparison space; training a linear classifier on the set of projected training vectors to generate a trained linear classifier operative in the comparison space; and transforming the trained linear classifier operative in the comparison space into a trained nonlinear classifier operative in the vector space by determining for each dimension of the vector space a one dimensional function based on the corresponding vector element comparison of the comparison function and trained parameters of the trained linear classifier. A classifier sub-system is configured to perform a method including outputting a classification based on applying the trained linear classifier to a received input vector defined in the vector space. The system comprises one or more digital processors programmed to perform the projecting, training, transforming, and outputting operations.

DETAILED DESCRIPTION

In the following, the terms "optimization", "minimization", and similar phraseology are to be broadly construed as one of ordinary skill in the art would understand these terms. For example, these terms are not to be construed as being limited to the absolute global optimum value, absolute global minimum, or so forth. For example, minimization of a function may employ an iterative minimization algorithm that terminates at a stopping criterion before an absolute minimum is reached. It is also contemplated for the optimum or minimum value to be a local optimum or local minimum value.

Figure 1:
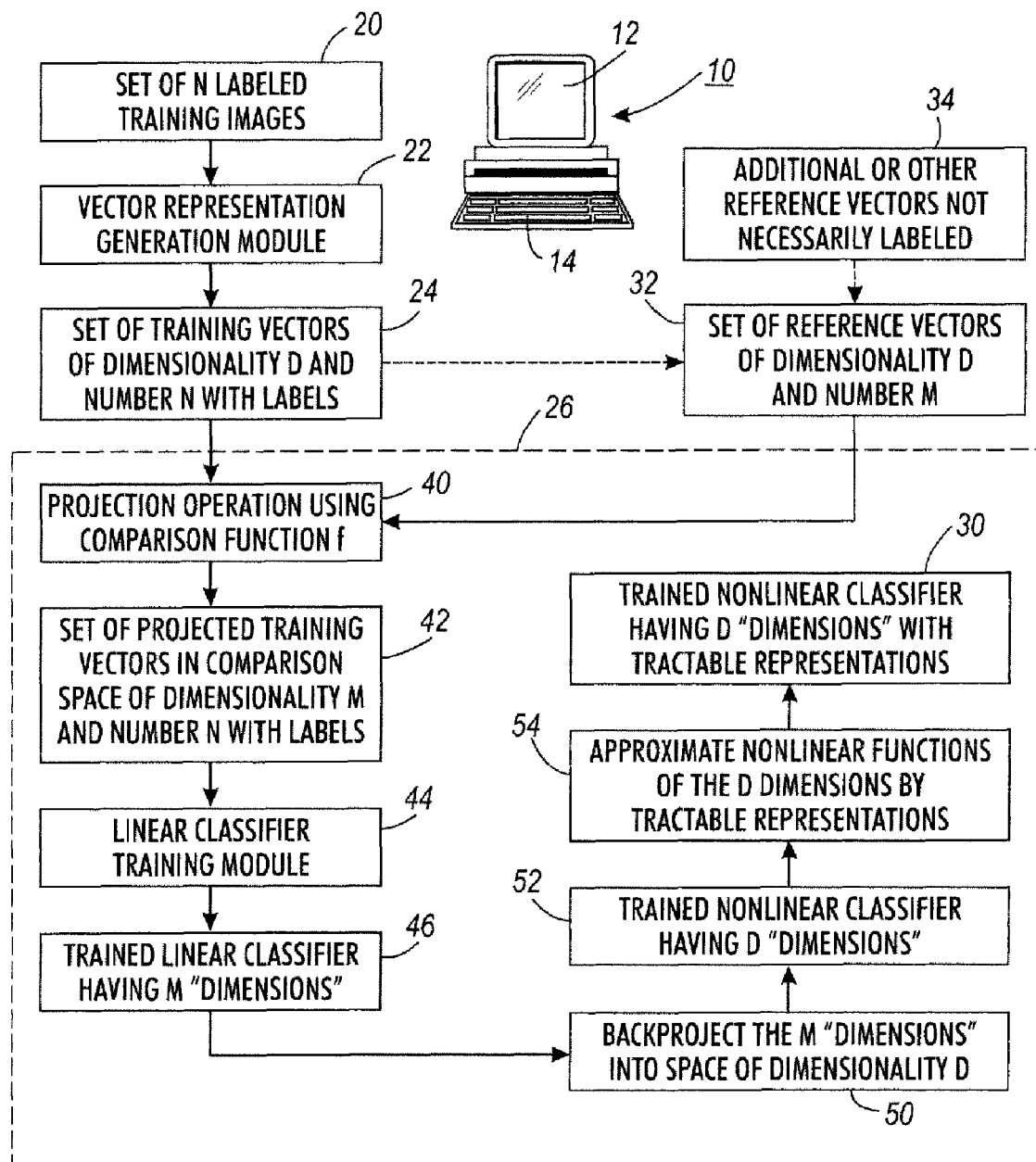
FIG. 1 diagrammatically shows a classifier training system.

With reference to FIG. 1, a digital system includes a computer 10 or other digital processing device that includes a digital processor (not shown). The digital processor can be variously embodied, such as by a single-core processor, a dual-core processor (or more generally by a multiple-core processor), a digital processor and cooperating math coprocessor, a digital controller, or so forth. The illustrated computer 10 is a desktop or laptop computer including a display 12 and a keyboard 14. Other interfacing devices, such as a second monitor, a mouse or trackball, or so forth can also be included. On the other hand, the illustrated computer 10 can be replaced by another digital processing device such as a network server having only network interfacing (for example, Internet or local area network (LAN) interfacing), or so forth.

Figure 2:
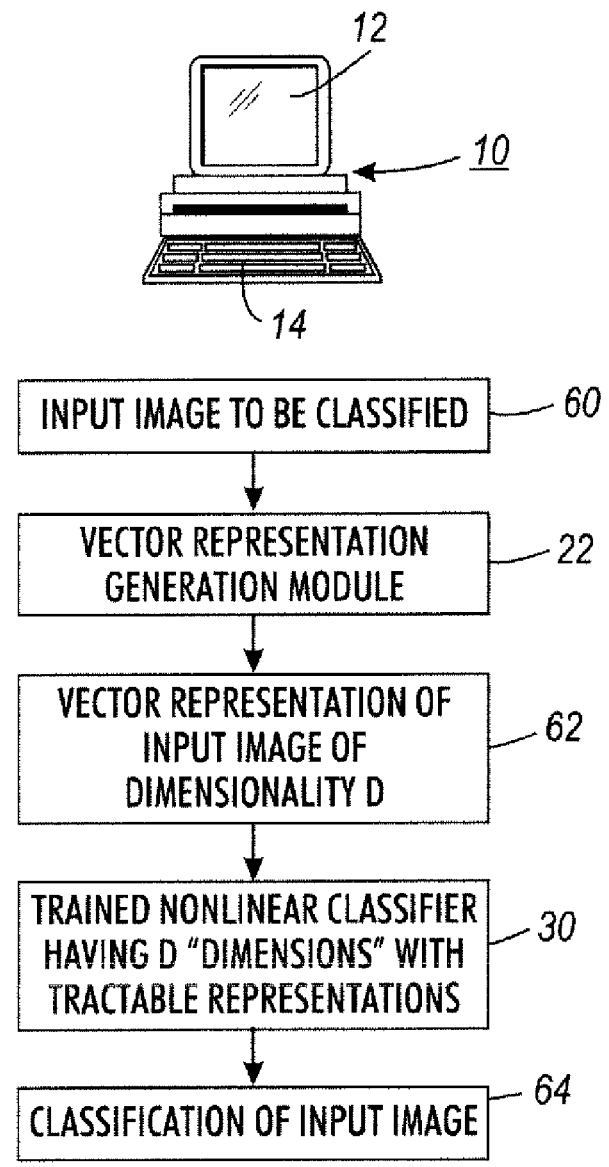
FIG. 2 diagrammatically shows a classifier system employing a classifier trained using the classifier training system of FIG. 1.

The computer 10 is configured by suitable programming or hardwired firmware to embody a classifier training system as diagrammatically represented in FIG. 1 and to embody a classifier system employing a classifier trained using the classifier training system of FIG. 1 as diagrammatically represented in FIG. 2. It is also contemplated for a different digital device, such as a graphical processing unit (GPU), network server, or so forth embody these systems. Further, it is contemplated for the classifier training system of FIG. 1 and the classifier system of FIG. 2 to be embodied by different digital devices. For example, the classifier training system of FIG. 1 may be embodied by a vendor-owned computer located at a product vendor location, while the classifier system of FIG. 2 may be embodied by a different end user-owned computer located at an end user location different from the vendor location.

The disclosed classifier training system and/or classifier system can also be embodied as a storage medium storing instructions which when executed on the illustrated computer 10 or on another digital processing device or devices embody the illustrated systems. The storage medium (not shown) may be, for example: a hard disk or other magnetic storage medium; an optical disk or other optical storage medium; a random access memory (RAM) chip or set of RAM chips; a read-only memory (ROM) chip or set of ROM chips; a FLASH memory; or so forth. The storage medium may be integral with the computer 10 (for example, an internal hard drive or RAM), or may be separate (for example, an external hard drive operatively connected with the computer 10), or may be separate and accessed via a digital data network such as a local area network (LAN) or the Internet (for example, as a redundant array of inexpensive or independent disks (RAID) or other network server storage that is indirectly accessed by the computer 10 via a digital network).

With reference to FIG. 1, the classifier training system operates on a training set of labeled images 20. Without loss of generality, the number of training images is denoted herein as N. The labels represent a priori information about the classifications of the images. For a hard binary classification, the labels can, for example, be "1" if the training image is assigned to the class and "0" otherwise. For a soft binary classification, the labels can, for example, be values in the range [0,1] indicating likelihood of membership in the class. In the illustrated embodiments, objects comprising images are processed, e.g. classified. However, this is merely an illustrative example, and it is to be understood that the disclosed classifier training system and classifier system can be employed in conjunction with other types of objects, such as speech segments or text documents. The N training images (or, more generally, N training objects) are processed by a vector representation generation module 22 to generate a corresponding N representative vectors 24 each having a dimensionality denoted herein as D. In the illustrative embodiment, the vector representation generation module 22 generates feature vectors represented as Fisher vectors, which can be used as vectorial representations for images. Although a Fisher vector representation is used in the illustrative example, other vector representations can also be employed, such as a "bag-of-visual-words" vector representation. The N representative vectors 24 are labeled with the classification information of the corresponding N training images 20. A classifier training module 26 trains classifier parameters using the N labeled representative vectors 24 as a training set in order to generate a trained nonlinear classifier 30.

The training approach disclosed herein and employed by the classifier training module 26 trains a linear classifier from which the trained nonlinear classifier 30 is derived. Moreover, with the training approach disclosed herein the trained nonlinear classifier 30 advantageously can be represented component-wise respective to the D dimensions of the vectors 24, with each component representation being a smooth, typically nonlinear, one-dimensional function that can be represented by a tractable mathematical representation such as a piecewise linear combination, piecewise constant function combination, or so forth. The trained nonlinear classifier 30 has accuracy characteristic of nonlinear classifiers, but has computational efficiency that scales linearly with the dimensionality D of the vectors 24 and is generally substantially more computationally efficient than other typical nonlinear classifiers.

With continuing reference to FIG. 1, these advantages are obtained by first projecting the training set of vectors 24 into a "similarity/dissimilarity" space of dimensionality M defined by a set of M reference vectors 32 also having dimensionality D. The set of M reference vectors 32 can be generated in various ways. For example, the set of M reference vectors 32 can be identically the same as the set of N training vectors 24, in which case M=N holds. In other embodiments, the set of M reference vectors 32 includes the set of N training vectors 24 plus some additional reference vectors 34, in which case M>N holds. In yet other embodiments, the additional reference vectors 34 are a wholly different set of vectors from the set of N training vectors 24 (that is, the set of reference vectors 32 is disjoint from the set of training vectors 24 in these embodiments), in which case there is no particular relationship between M and N. In yet other embodiments, the set of M reference vectors 32 includes a subset of the set of N training vectors 24, in which case M<N holds. In still yet other embodiments, the set of M reference vectors 32 includes a subset of the set of N training vectors 24 and some additional reference vectors 34, in which case there is no particular relationship between M and N. The vectors of the set of M reference vectors 32 do not need to be labeled with classification information. If some or all of the vectors of the set of N training vectors 24 is included in the set of M reference vectors 32, then the label information is not utilized in the reference set 32.

The additional vectors 34, if included in the set of reference vectors 32, should have the same dimensionality D as the vector space of the training vectors 24, and should have element-by-element correspondence. For example, in the illustrated embodiment the additional vectors 34 are suitably generated by applying the vector representation generation module 22 to additional images (not shown) so that vector elements of the additional vectors 34 have the same "meaning" (that is, derived from equivalent image patches or portions and representing the same image characteristic or property) as the corresponding vector elements of the same dimension in the training vectors 24.

In the following, without loss of generality the set of N training vectors 24 is represented as $\{x_i, i=1, \ldots, N\}$ where each training vector $x_i$ has dimensionality D. The set of M reference vectors 32 is represented herein without loss of generality as $\{r_m=1, \ldots, M\}$ where each reference vector $r_m$ also has dimensionality D. The projection of the training set of vectors 24 into a "similarity/dissimilarity" space of dimensionality M defined by a set of M reference vectors 32 employs a similarity or distance measure $f$ having the form:

$$f(x_i, r_m) = \sum_{d=1}^{D} f_d(x_i(d), r_m(d)), \qquad (1)$$

where the notation $x_i(d)$ represents the value of the $d^{th}$ dimension of training vector $x_i$, the notation $r_m(d)$ represents the value of the $d^{th}$ dimension of reference vector $r_m$, and the function $f_d$ has dependence on $x_i(d)$ and $r_m(d)$ but does not have dependence on the values of vector elements of any other dimensions other than the $d^{th}$ dimension. The projection of the vector $x_i$ into the "similarity/dissimilarity" space of dimensionality M is denoted herein as $P\{x_i\}$ which is a vector having dimensionality M and can be written as $P\{x_i\}=[f(x_i, r_1), f(x_i, r_2), \ldots, f(x_i, r_M)]$.

The similarity or distance measure $f$ should provide a meaningful comparison of the argument vectors. For example, if $f$ is a similarity measure then $f(v_1, v_2)$ should generally increase as the vectors $v_1$ and $v_2$ become more similar; whereas, if $f$ is a distance then $f(v_1, v_2)$ should generally increase as the vectors $v_1$ and $v_2$ become less similar. The term "comparison measure" or "comparison metric" or "comparison function" or similar phraseology is used herein to encompass a similarity or distance measure. In similar fashion, the term "comparison space" or similar phraseology is used herein to indicate the "similarity/dissimilarity" space defined by the set of M reference vectors 32.

The comparison measure $f$ should be a sum of comparison measures $f_d$ of the individual dimensions $d=1, \ldots, D$, as indicated in Equation (1). That is, the comparison function $f$ comprises a vector element comparison $f_d$ for each dimension d of the vector space summed over the D dimensions of the vector space. Some suitable comparison measures $f$ include, for example: an L1 (Manhattan) distance such as:

$$f_{L1}(x_i, r_j) = \sum_{d=1}^{D} |x_i(d) - r_j(d)|; \qquad (2)$$

A squared L2 (Euclidean) distance such as:

$$f_{L2}(x_i, r_j) = \sum_{d=1}^{D} (x_i(d) - r_j(d))^2; \qquad (3)$$

a normalized chi-squared distance such as:

$$f_{chi2}(x_i, r_j) = \frac{1}{2} \sum_{d=1}^{D} \frac{(x_i(d) - r_j(d))^2}{x_i(d) + r_j(d)}; \qquad (4)$$

or so forth. The chi-squared function can optionally have the normalization factor ½ moved inside the summation in order to strictly meet the form of Equation (1).

With continuing reference to FIG. 1, a projection operation 40 uses the comparison function $f$ of Equation (1) to project the set of training vectors 24 in the vector space of dimensionality D to a comparison space defined by the set of reference vectors 32 to generate a corresponding set of projected training vectors 42 in the comparison space of dimensionality M. The projected training vectors 42 are $P\{x_i\}=[f(x_i, r_1), f(x_i, r_2), \ldots, f(x_i, r_M)]$. Thus, there is a one-to-one correspondence between the training vectors $x_i$ 24 and the projected training vectors $P\{x_i\}$ 42. However, the dimensionality M of the projected training vectors 42 may be higher or lower than the dimensionality D of the training vectors 24. Typically, it is preferable to have the dimensionality M of the projected training vectors be comparable with or larger than the dimensionality D of the training vectors 24, since if D>>M then the projection operation 40 causes data compression and possibly consequent loss of information.

A linear classifier training module 44 trains a linear classifier using the set of projected training vectors $P\{x_i\}$ 42 as training data, in order to produce a trained linear classifier 46 having M "dimensions" corresponding to the dimensionality of the projected training vectors 42. The goal of the training module 44 is to train a linear classifier having parameters (w,b) on the set of projected training vectors $P\{x_i\}$, $i=1, \ldots, N$ 42. The parameter w is a set of adjustable parameters organized as elements of a normal vector with respect to the separating hyperplane. The parameter b is a scalar adjustable parameter that is the offset. The training determines optimal values for the adjustable parameters (w,b) such that the output of the trained linear classifier 46 substantially matches the classification labels of the set of projected training vectors $P\{x_i\}$, $i=1, \ldots, N$ 42, where again the classification labels are taken from the corresponding labeled training vectors $x_i$ 24. Substantially any training algorithm can be employed. A suitable training algorithm is sparse logistic regression (SLR) (see, e.g., Krishnapuram et al., "Sparse multinomial logistic regression: Fast algorithms and generalization bounds", IEEE PAMI (2005)), which is described herein as an illustrative example. Let $\{y_i, i=1, \ldots, N\}$ be the set of classification labels associated with the training data 24 (and, equivalently, associated with the corresponding projected training vectors 42). For this illustrative example, the classification labels $y_i$ are binary, with $y_i=1$ indicating the $i^{th}$ sample belongs to the target class and $y_i=0$ indicating that the $i^{th}$ sample does not belong to the target class. The objective function which is maximized with respect to the adjustable parameters (w,b) for SLR is as follows:

$$\sum_{i=1}^{N} [y_i(w'P(x_i) + b) - \log(1 + \exp(w'P(x_i) + b))] - \lambda \|w\|_1, \qquad (5)$$

where $\|w\|_1$ denotes the L1-norm of the adjustable parameters vector w and $\lambda$ is a regularization parameter that is tuned using cross-validation or another tuning basis. The optimization of the objective function of Equation (5) is a convex optimization problem which can be solved in order O(NM).

A potential advantage of SLR is that it should provide a sparse solution, meaning that some of the dimensions of the adjustable parameters vector w should be exactly equal to zero. This means that, at test time, classifying a sample x should require the computation of the comparison measure $f$ between x and only a subset of the reference vectors 32. This property is similar to that of the Support Vector Machine (SVM). The larger the tuning parameter $\lambda$, the sparser the solution and therefore the faster the classifier at runtime. However, if the parameter $\lambda$ is tuned to be close to zero based on cross-validation or other considerations, then this potential advantage is not realized in practice.

Although SLR is described as an illustrative embodiment of the linear classifier training module 44, other training algorithms can also be used, such as linear SVM, relevance vector machine, or so forth.

The trained linear classifier 46 is operative in the comparison space having dimensionality M. Accordingly, it has M "dimensions", in that it has M linear components defined by the M optimized parameters of the optimized adjustable parameters vector w. An input vector $x_{input}$ could be classified using the trained linear classifier 46 by projecting into the comparison space, that is, computing $P\{x_{input}\}=[f(x_{input}, r_1), f(x_{input}, r_2), \ldots, f(x_{input}, r_M)]$, and applying the trained linear classifier 46 operating in the comparison space as follows:

$$s(x_{input}) = w'P\{x_{input}\} + b = \sum_{m=1}^{M} w(m)f(x_{input}, r_m) + b, \quad (6)$$

where $w(m)$ is the $m^{th}$ adjustable parameter element of the adjustable parameters vector w, and the righthand summation of Equation (6) expresses the M "dimensions" of the trained linear classifier 46 as a sum of linear components. Although Equation (6) could be used to classify the input vector $x_{input}$, it is not computationally efficient and would not provide a fast classifier.

With continuing reference to FIG. 1, the following alternative process is employed to provide a fast, albeit nonlinear, classifier. The trained linear classifier 46 is "backprojected" in an operation 50 into the original vector space of dimensionality D, to generate a trained nonlinear classifier 52 having D "dimensions". The backprojection operation 50 uses the fact that the comparison measure $f$ of Equation (1) can be decomposed over the D dimensions. Using this fact (or, in other words, combining Equations (1) and (6)), the linear classifier of Equation (6) can be written as:

$$s(x_{input}) = \sum_{m=1}^{M} w(m) \sum_{d=1}^{D} f_d(x_{input}(d), r_m(d)) + b. \quad (7)$$

The summations can be reversed to yield:

$$s(x_{input}) = \sum_{d=1}^{D} \sum_{m=1}^{M} w(m) f_d(x_{input}(d), r_m(d)) + b. \quad (8)$$

Equation (8) can be written a (in general) nonlinear classifier function operative in the original vector space of D dimensions as follows:

$$s(x_{input}) = \sum_{d=1}^{D} \phi_d(x_{input}(d)) + b, \quad (9)$$

where $\phi_d(x_{input}(d))$ is a one-dimensional function of $x_{input}(d)$ based on (i) the vector element comparison $f_d$ of the comparison function $f$ for the $d^{th}$ dimension of the vector space and (ii) trained parameters (w,b) of the trained linear classifier 44. The one-dimensional function $\phi_d(x_{input}(d))$ can be written as follows:

$$\phi_d(x_{input}(d)) = \sum_{m=1}^{M} w(m) f_d(x_{input}(d), r_m(d)). \quad (10)$$

There are D such one-dimensional functions corresponding to the D dimensions of the original vector space of the training vectors 24. Accordingly, the trained nonlinear classifier 52 of Equation (9) can be viewed as having D "dimensions", each of which is defined by the (in general) nonlinear but one-dimensional function $\phi_d(x_{input}(d))$ given in Equation (10).

In principle, Equations (9) and (10) could be applied directly to an input vector $x_{input}$ to classify the vector. However, the one-dimensional functions are nonlinear and hence computationally expensive to compute directly. Nonetheless, although the one-dimensional functions $\phi_d(x_{input}(d))$ are nonlinear, they are smooth and can be accurately approximated. Toward this end, an approximation operation 54 approximates the nonlinear one-dimensional functions $\phi_d(x_{input}(d))$ of the D dimensions by tractable representations, such as a piecewise combination of one-dimensional analytical functions, in order to generate the final trained nonlinear classifier 30 having D "dimensions" with tractable representations. The one-dimensional analytical functions can, for example, be constant functions, linear functions, polynomial functions, or other analytical functions that are easily computed. In a suitable approach, for each dimension d, the one-dimensional function $\phi_d(x_{input}(d))$ is split or segmented into a set of K intervals or bins, and the function $\phi_d(x_{input}(d))$ is approximated over each interval with the chosen constant, linear, polynomial, or other chosen one-dimensional analytical function. The resulting approximation is piecewise constant, or piecewise linear, or so forth.

With reference to FIG. 2, a classifier system employing the trained nonlinear classifier 30 is described, which is suitably embodied as the computer 10 with suitable programming, or as a storage medium storing instructions that when executed by the computer 10 or another digital processor perform the disclosed classifier operations. The classifier system of FIG. 2 receives an input image 60 to be classified. The vector representation generation module 22 (or a different module with the same black box performance as the module 22) processes the input image 60 to generate a corresponding input vector $x_{input}$ 62 having the vector space dimensionality D. The trained nonlinear classifier 30 is applied to the input vector $x_{input}$ 62 to generate a classification 64 of the input image. Toward this end, in each dimension d the interval or bin of the piecewise approximation that contains the input vector element $x_{input}(d)$ is identified. The constant, linear, polynomial, or other analytical function for that interval or bin is then evaluated for the value $x_{input}(d)$ in order to approximate $\phi_d(x_{input}(d))$. This is repeated for each of the D dimensions, and the approximated $\phi_d(x_{input}(d))$ values are combined in accordance with Equation (9) in order to generate the classification 64.

Advantageously, at classification time there is no need to perform the computationally costly operation of projecting the input vector $x_{input}$ 62 into the comparison space. Indeed, there is not even any need to directly evaluate the potentially complex nonlinear functions $\phi_d(x_{input}(d))$. Rather, the processing of the classifier system of FIG. 2 entails (for each dimension) retrieval of the relevant one-dimensional analytical function based on the value $x_{input}(d)$ (which can be done using a simple look-up table) and evaluation of the retrieved analytical function for the value $x_{input}(d)$, and additively combining the values in accordance with Equation (9). The cost of storing a classifier is of order O(KD), and the cost of classifying the input vector $x_{input}$ 62 is of order O(D).

The disclosed classifier system has been implemented and tested on an image categorization task of the PASCAL Visual Object Classes (VOC) 2007 benchmark. This task includes 20 object categories: person, bird, cat, cow, dog, horse, sheep, aeroplane, bicycle, boat, bus, car, motorbike, train, bottle, chair, dining table, potted plant, sofa and TV monitor. The provided set of training images includes 5,011 training images, and a further 4,092 images are provided for testing. Performance was measured using the average precision (AP), reporting the mean over the 20 categories. The extraction of Fisher vectors is described in detail in [PD07]. For the comparison metric $f$ the L1 norm between the L1-normalized vectors was used, which is a good measure on Fisher vectors. This measure can be decomposed as a sum of distance over the D dimensions. In these tests, the 5,011 training images were also used as the set of reference images. Therefore, N=M for these tests. Four different classifiers were compared: (1) SLR-L: a linear classifier learned directly on the Fisher vectors using SLR as done in Perronnin et al., "Fisher kernels on visual vocabularies for image categorization", IEEE CVPR (2007); (2) SVM-NL: a nonlinear SVM classifier based on the exponentiated "kernel" in which a y parameter was set to the average distance between vectors on the training set as is common practice (see Zhang et al., "Local Features and Kernels for Classification of Texture and Object Categories: an In-Depth Study". Technical Report RR-5737, INRIA, 2005; (3) SLR-NLE: a nonlinear exact SLR classifier corresponding to Equation (5); and (4) SLR-NLA: a nonlinear approximate SLR classifier corresponding to Equations (9) and (10) with the nonlinear one-dimensional functions $\phi_d(x_{input}(d))$ approximated using piecewise combinations of constant functions (corresponding to the trained nonlinear classifier 30 of FIGS. 1 and 2).

TABLE 1

|  | SLR-L | SVM-NL | SLR-NLE | SLR-NLA |
|---|---|---|---|---|
| AP (in %) | 46.0 | 52.3 | 52.9 | 52.4 |
| Storage cost (in vectors) | 1 | 5,011 | 5,011 | 100 |
| Runtime cost (per sample) | 0.34 ms | 280 ms | 280 ms | 10 ms |

Figure 3:
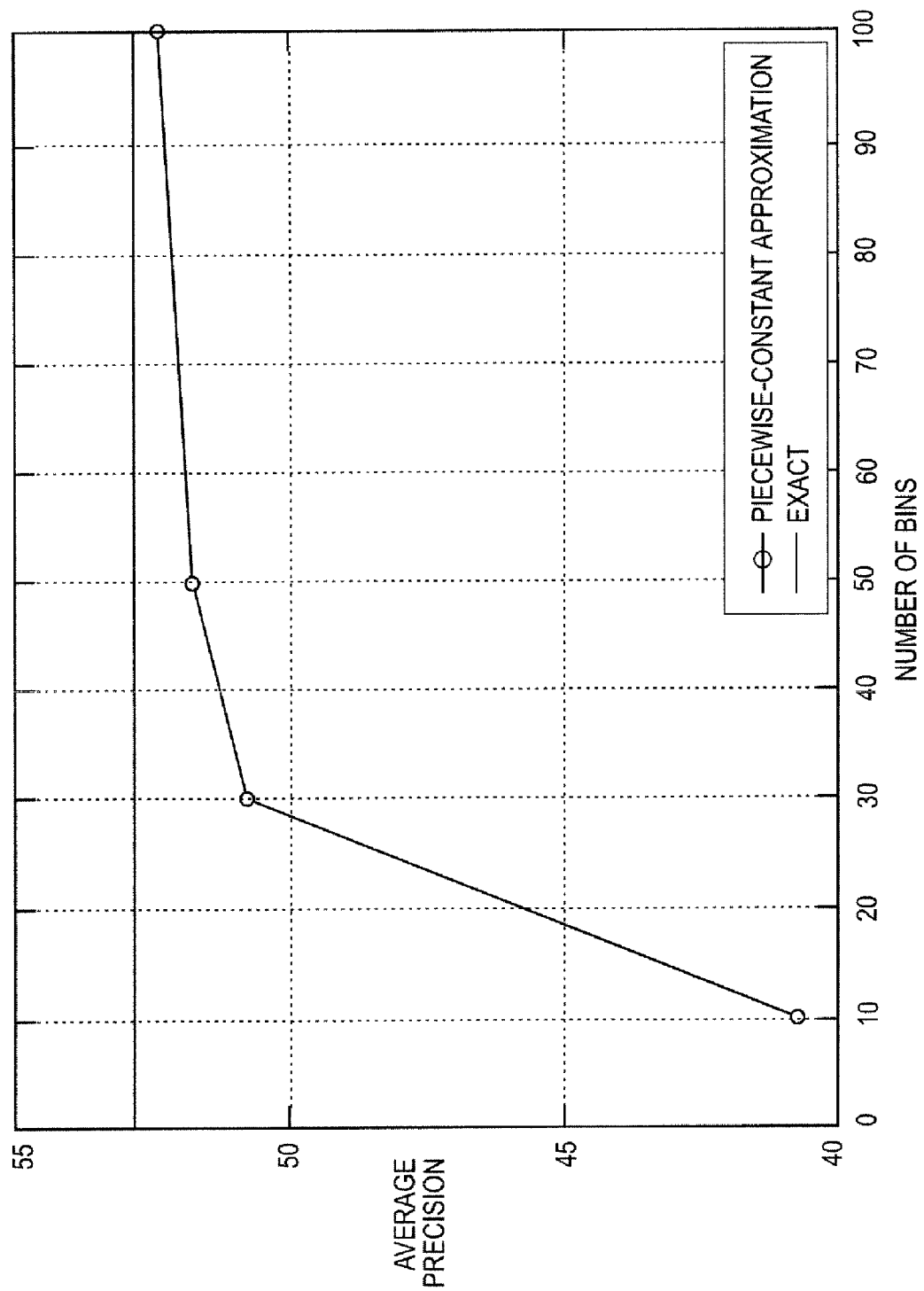
FIG. 3 plots some experimental results.

With reference to FIG. 3, an AP comparison is shown between SLR-NLE and SLR-NLA. As the number of bins increases the performance of the approximate classifier (that is, the classifier 30 of FIGS. 1 and 2) converges to that of the exact classifier. Table 1 compares the figures of merit of the four actually tested classifier systems. It is seen that the performance of the approximate classifier (that is, the classifier 30 of FIGS. 1 and 2) provides an advantageous compromise between accuracy and speed.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. A method comprising:
projecting a set of training vectors in a vector space to a comparison space defined by a set of reference vectors using a comparison function to generate a corresponding set of projected training vectors in the comparison space wherein the comparison function comprises a vector element comparison for each dimension of the vector space summed over the dimensions of the vector space;
training a linear classifier on the set of projected training vectors to generate a trained linear classifier operative in the comparison space; and
transforming the trained linear classifier operative in the comparison space into a trained nonlinear classifier operative in the vector space;
wherein the projecting, the training, and the transforming are performed by a digital processing device.

2. The method as set forth in claim 1, wherein the comparison function is selected from a group consisting of an L1 distance, a squared L2 distance, and a chi-squared distance.

3. The method as set forth in claim 1, wherein the transforming comprises:
for a first dimension of the vector space, determining a one-dimensional function based on (i) the vector element comparison of the comparison function for the first dimension of the vector space and (ii) trained parameters of the trained linear classifier; and
repeating the determining for the remaining dimensions of the vector space.

4. The method as set forth in claim 3, wherein the determining comprises:
for the first dimension of the vector space, determining the one-dimensional function $\phi_d$ as $$\phi_d(x_i(d)) = \sum_{m=1}^{M} w_m \cdot f_d(x_i(d), r_m(d))$$

where d denotes the first dimension of the vector space, $x_i$ denotes an $i^{th}$ training vector of the set of training vectors, M denotes the number of reference vectors in the set of reference vectors defining the comparison space, $r_m$ denotes the $m^{th}$ reference vector of the set of reference vectors, and $f_d$ denotes the vector element comparison of the comparison function for the first dimension of the vector space.

5. The method as set forth in claim 4, wherein the determining further comprises:
constructing the trained nonlinear classifier $s(x_{input})$ operative in the vector space as $$s(x_{input}) = \sum_{d=1}^{D} \phi_d(x_{input}) + b$$

where $x_{input}$ is an input vector to be classified, D is the dimensionality of the vector space, and b is a trained scalar parameter of the trained linear classifier.

6. The method as set forth in claim 3, wherein the determining further comprises:
for the first dimension of the vector space, approximating the one-dimensional function by a piecewise combination of one-dimensional analytical functions; and
repeating the approximating for the one-dimensional functions of the remaining dimensions of the vector space.

7. The method as set forth in claim 6, wherein the one-dimensional analytical functions are selected from a group consisting of (i) constant functions, (ii) linear functions, and (iii) polynomial functions.

8. The method as set forth in claim 6, wherein the one-dimensional analytical functions define bins, and the method further comprises:
classifying an input vector in the vector space using the trained nonlinear classifier operative in the vector space, the classifying including for each dimension of the vector space evaluating only the one-dimensional analytical function defining the bin containing the input vector element, wherein the classifying is performed by the digital processing device.

9. A computer programmed to classify an input vector using a trained nonlinear classifier operative in a vector space and generated by a method as set forth in claim 1.

10. A method comprising:
projecting a set of training vectors in a vector space to a comparison space defined by a set of reference vectors using a comparison function to generate a corresponding set of projected training vectors in the comparison space;
training a linear classifier on the set of projected training vectors to generate a trained linear classifier operative in the comparison space; and
transforming the trained linear classifier operative in the comparison space into a trained nonlinear classifier operative in the vector space;
wherein the projecting, the training, and the transforming are performed by a digital processing device; and
wherein the set of reference vectors is selected from a group consisting of:
the set of training vectors,
the set of training vectors plus additional vectors in the vector space,
a subset of the set of training vectors plus additional vectors in the vector space, and
a set of vectors in the vector space that is disjoint from the set of training vectors.

11. A computer programmed to classify an input vector using a trained nonlinear classifier operative in a vector space and generated by a method as set forth in claim 10.

12. A method comprising:
projecting a set of training vectors in a vector space to a comparison space defined by a set of reference vectors using a comparison function to generate a corresponding set of projected training vectors in the comparison space;
training a linear classifier on the set of projected training vectors to generate a trained linear classifier operative in the comparison space;
transforming the trained linear classifier operative in the comparison space into a trained nonlinear classifier operative in the vector space; and
classifying an input vector in the vector space using the trained nonlinear classifier operative in the vector space;
wherein the projecting, the training, the transforming, and the classifying are performed by a digital processing device.

13. The method as set forth in claim 12, wherein the classifying does not include projecting the input vector to the comparison space.

14. The method as set forth in claim 12, further comprising:
generating the set of training vectors, the set of reference vectors, and the input vector from images, wherein the generating is performed by the digital processing device.

15. The method as set forth in claim 14, wherein the set of training vectors, the set of reference vectors, and the input vector are Fisher vectors.

16. A computer programmed to classify an input vector using a trained nonlinear classifier operative in a vector space and generated by a method as set forth in claim 12.

17. A non-transitory computer-readable storage medium encoded with instructions executable by a digital processor to perform a method comprising (i) projecting a set of training vectors in a vector space to a comparison space defined by a set of reference vectors using a comparison function comprising a vector element comparison for each dimension of the vector space summed over the dimensions of the vector space to generate a corresponding set of projected training vectors in the comparison space, (ii) training a linear classifier on the set of projected training vectors to generate a trained linear classifier operative in the comparison space, and (iii) transforming the trained linear classifier operative in the comparison space into a trained nonlinear classifier operative in the vector space, wherein the comparison function is selected from a group consisting of an L1 distance, a squared L2 distance, and a chi-squared distance.

18. A non-transitory computer-readable storage medium encoded with instructions executable by a digital processor to perform a method comprising (i) projecting a set of training vectors in a vector space to a comparison space defined by a set of reference vectors using a comparison function comprising a vector element comparison for each dimension of the vector space summed over the dimensions of the vector space to generate a corresponding set of projected training vectors in the comparison space, (ii) training a linear classifier on the set of projected training vectors to generate a trained linear classifier operative in the comparison space, and (iii) transforming the trained linear classifier operative in the comparison space into a trained nonlinear classifier operative in the vector space, wherein the transforming comprises determining for each dimension of the vector space a one-dimensional function based on the corresponding vector element comparison of the comparison function and trained parameters of the trained linear classifier.

19. A system comprising:
a classifier training sub-system comprising a computer configured to perform a method including:
projecting a set of training vectors in a vector space to a comparison space defined by a set of reference vectors using a comparison function comprising a vector element comparison for each dimension of the vector space summed over the dimensions of the vector space to generate a corresponding set of projected training vectors in the comparison space,
training a linear classifier on the set of projected training vectors to generate a trained linear classifier operative in the comparison space, and
transforming the trained linear classifier operative in the comparison space into a trained nonlinear classifier operative in the vector space by determining for each dimension of the vector space a one-dimensional function based on the corresponding vector element comparison of the comparison function and trained parameters of the trained linear classifier, wherein the transforming further includes approximating each one-dimensional function by a piecewise combination of analytical functions, the outputting applying the trained linear classifier using the approximated one-dimensional functions; and
a classifier sub-system comprising a computer configured to perform a method including:
outputting a classification based on applying the trained linear classifier to a received input vector defined in the vector space;
wherein the system comprises one or more digital processors programmed to perform the projecting, training, transforming, and outputting operations.

* * * * *